United States Patent [19]

Veasy et al.

[11] Patent Number: 5,343,220
[45] Date of Patent: Aug. 30, 1994

[54] FORCE MONITOR OF AN ELECTRONIC PAINT BRUSH APPARATUS

[75] Inventors: Julian F. Veasy, Bucks; Stephen Freeman, Bedfordshire, both of England

[73] Assignee: Crosfield Electronics Limited, Stevenage, United Kingdom

[21] Appl. No.: 31,915

[22] Filed: Mar. 16, 1993

Related U.S. Application Data

[63] Continuation of Ser. No. 687,798, Apr. 19, 1991, abandoned.

[30] Foreign Application Priority Data

Apr. 20, 1990 [GB] United Kingdom ............... 9008946

[51] Int. Cl.⁵ ............................................. G09G 1/28
[52] U.S. Cl. ..................................... 345/199; 345/179
[58] Field of Search ............... 340/706, 709, 710, 701, 340/703; 358/76, 78, 80, 81; 345/150, 147, 186, 199, 156, 173, 179, 180, 182

[56] References Cited

U.S. PATENT DOCUMENTS

| | | | |
|---|---|---|---|
| 4,200,867 | 4/1980 | Hill | 340/703 |
| 4,524,421 | 6/1985 | Searby et al. | 340/706 |
| 4,598,282 | 7/1986 | Pugsley | 340/703 |
| 4,829,455 | 5/1989 | Long et al. | 340/703 |
| 5,142,273 | 8/1992 | Wobermine | 345/199 |

FOREIGN PATENT DOCUMENTS

| | | |
|---|---|---|
| 0332417 | 9/1989 | European Pat. Off. |
| 0344976 | 12/1989 | European Pat. Off. |
| 2116407 | 9/1983 | United Kingdom |
| 8203712 | 10/1982 | World Int. Prop. O. ......... 340/709 |

OTHER PUBLICATIONS

"Ampex AVA-3 Video Art System", by Robert van der Leeden, Aug., 1986, Image Technology pp. 392-394.

Primary Examiner—Richard Hjerpe
Assistant Examiner—Chanh Nguyen
Attorney, Agent, or Firm—Sughrue, Mion, Zinn, Macpeak & Seas

[57] ABSTRACT

Image processing apparatus comprises an input device including an indicator and a surface over which the indicator is moved. A host determines the position of the indicator on the surface and also the force by which the indicator is placed onto the surface. Frame stores store digital data defining the color component content of an image. The host simulates an electronic paint brush carrying paint whose characteristics are determined at least in part in accordance with the force of the indicator on the surface.

7 Claims, 4 Drawing Sheets

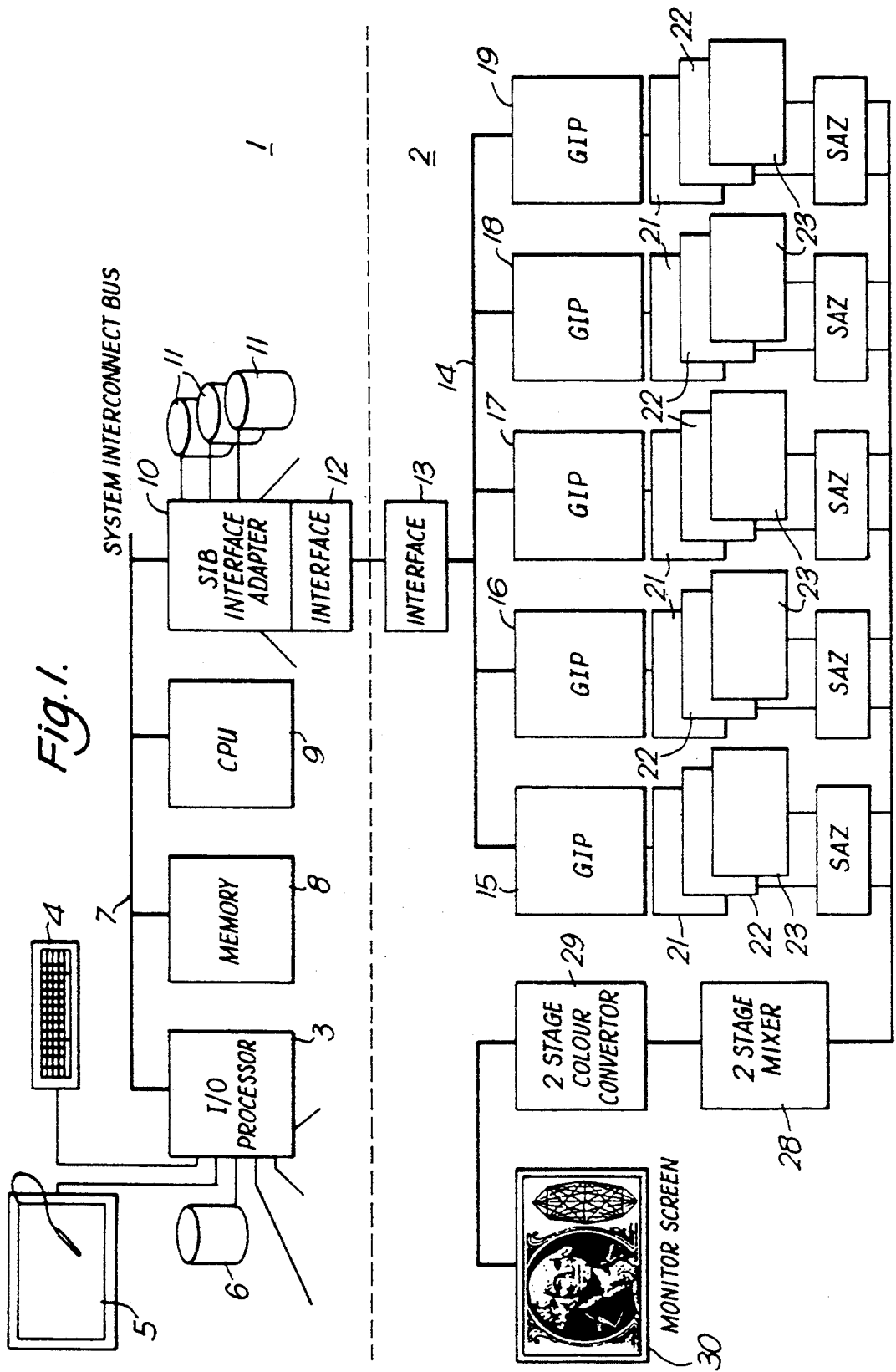

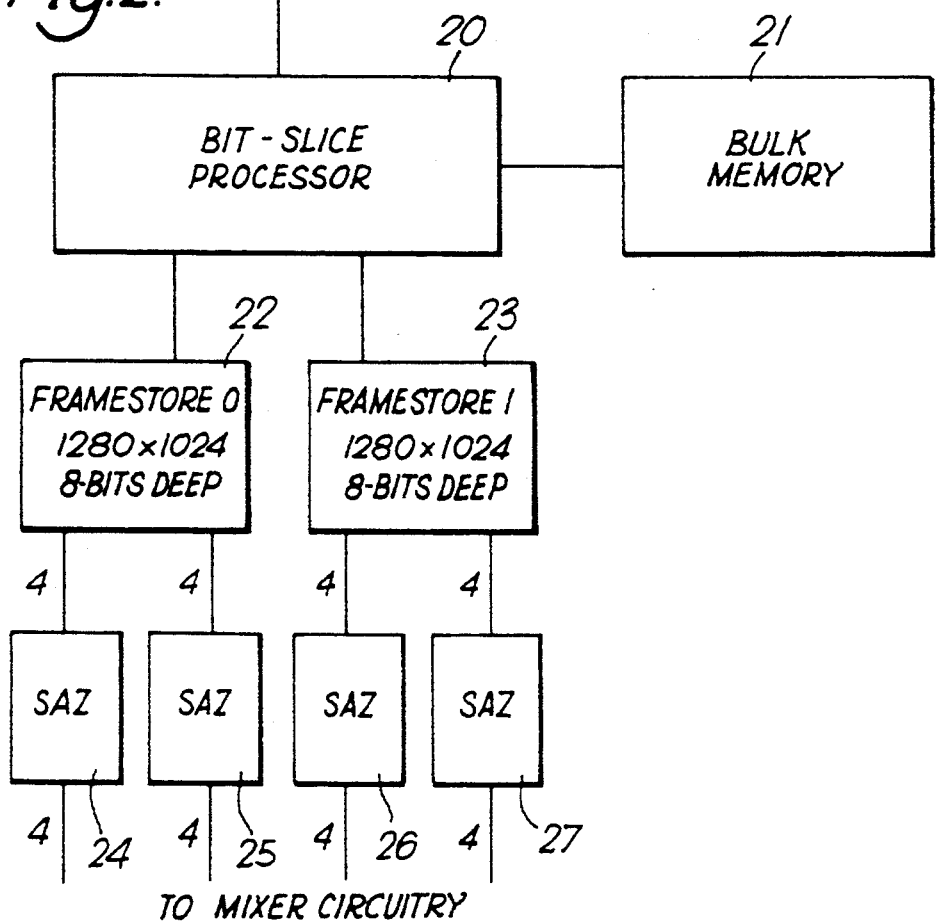

FORCE MONITOR OF AN ELECTRONIC PAINT BRUSH APPARATUS

This is a continuation of application Ser. No. 07/687,798 filed Apr. 19, 1991, now abandoned.

FIELD OF THE INVENTION

The invention relates to image processing apparatus.

SUMMARY OF THE INVENTION

In accordance with the present invention, image processing apparatus comprises an input device including an indicator and a surface over which the indicator is moved; position determining means for determining the position of the indicator on the surface; a force monitor for monitoring the force with which the indicator is pressed onto the surface; a frame store for storing digital data defining the color component content of an image; and processing means connected to the input device and the frame store for simulating an electronic paint brush carrying paint which is laid down in the frame store at locations corresponding to the positions of the indicator on the surface and whose characteristics are determined at least in part in accordance with the force monitored by the force monitor.

We have developed a new type of image processing apparatus which enables many interesting and unusual effects to be achieved in which the characteristics of the paint carried by the paint brush are determined at least in part by the force with which the indicator is pressed onto the surface. Examples of paint characteristics include hue, brightness and saturation. A particularly advantageous application involves modifying brightness and saturation while maintaining hue constant.

The invention is applicable to modifying images which have been scanned using a conventional electronic scanner but is particularly applicable to images which are created electronically by use of the input device. The invention can be used to create an image in the frame store or to modify an existing image in which the new paint is combined with previous paint in a known manner.

Preferably, the processing means applies to the monitored force value a color selection function for each color component, the color selection function defining the variation in characteristic(s) of the corresponding color component with monitored force.

Preferably, the color selection function is discontinuous and defines color component values for spaced groups of force values. Thus, in this case, there will be certain force values for which a color component value of zero is obtained.

Other forms of the color selection function are also possible so that for example the function can define a straight or curved variation or be non-uniform and can vary either in a controlled manner or in a random manner, for example separate Gaussian variations in each color channel. That is each component could have a random offset added or subtracted from the current color value, the probability of any particular offset being e.g. Gaussian. The pen pressure would be used to modulate the "width of the Gaussian curve, with hard pressure giving a higher probability of getting a given, large change from the "base" color.

Where the image is defined by more than one color component, the associated color selection functions are preferably different.

The processing means defines, in a conventional manner, the shape, size and density profile of the brush.

Typically, the indicator comprises a pressure pen and the surface is defined by a digitizing tablet. Other forms of input device, however, are also possible.

Preferably, the apparatus further comprises a display connected to the frame store so as to display the image defined by digital data in the frame store.

The processing means may be provided by a suitably programmed computer or by hard wired circuits.

BRIEF DESCRIPTION OF THE DRAWINGS

An example of image processing apparatus according to the invention will now be described with reference to the accompanying drawings, in which:

FIG. 1 is a block diagram of the apparatus;

FIG. 2 is a block diagram of the graphics image processor of FIG. 1;

DETAILED DESCRIPTION OF THE EMBODIMENTS

Figure 3A:
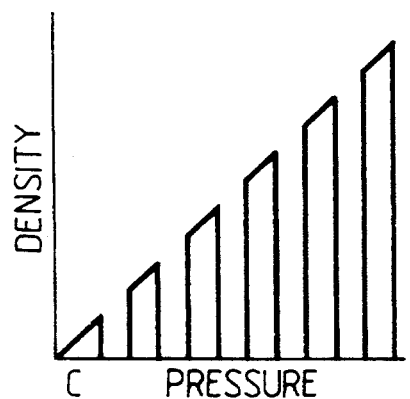
FIGS. 3A–3D illustrate four different color selection functions.

The apparatus shown in FIG. 1 can be divided into two primary parts. These comprise the host 1 and the graphics sub-system 2. The division is shown in FIG. 1 by a dashed line. The host 1 is a 68020 microprocessor based system running UNIX which is a multi-tasking, multi-user operating system. The host comprises an I/O processor 3 coupled to a keyboard 4, a digitizing tablet 5 and associated pen 31, a system disk 6 and other data sources (not shown). The I/O processor 3 is connected to a system inter-connect bus (SIB) 7 which is connected to ROM and RAM memory 8, a CPU 9, and an interface adapter 10. The interface adapter 10 is connected to a number of high speed image discs 11 which hold data defining the color content of pixels of images at high resolution, the adapter also being connected via an interface 12 with the graphics sub-system 2. As mentioned above, the host has a conventional form and will not be described in detail. However, the SIB 7 is described in more detail in EP-A-0332417.

The program that runs on the host is a single "process" which reads and processes inputs from the digitizing tablet 5 under operator control and directs the graphics part 2 to display the host's responses to those inputs on the graphics monitor 30. Essentially, the system takes advantage of the host system in being able to perform a majority of the calculations so that only a small amount of control data is passed to the graphics sub-system. This graphics part 2 is much better than the host 1 at creating and manipulating graphical objects but the host is better at controlling input/output to peripherals, discs and tapes and is relatively easy to program.

The graphics sub-system 2 comprises an interface 13 which connects the graphics part to the host 1, the interface 13 being connected to a bus 14. The bus 14 is connected to five graphics image processors (GIPs) 15–19. In this embodiment, it is assumed that the images are defined by four color components, namely cyan, magenta, yellow and black, there being a separate GIP for each color. Thus, the GIP 15 processes the cyan color component, the GIP 16 the magenta color component, the GIP 17 the yellow color component and the GIP 18 the black color component. If the image was represented by a different number of color components, for example red, green and blue then only three of the GIPs would be needed. The advantage of providing the GIPs 15–18 in parallel is that each component of each pixel in the image can be processed in parallel so that the overall processing time is reduced by up to four times over the processing time with a single processor. A further advantage of using the GIPs is that each has a bit-slice processor on which the programmer can define instructions useful for a particular application.

A fifth GIP 19 is provided for defining one or more masks and other features.

The construction of one of the GIPs of FIG. 1 is shown in FIG. 2. Each GIP comprises a bit-slice processor 20 coupled to bulk memory 21. This memory 21 will hold image data, brush profiles and text as required and is used as virtual image memory.

The bit-slice processor 20 is also connected to a pair of framestores 22, 23 each of which has dimensions 1280×1204 and is 8 bits deep In the GIPs 15–18, each framestore will hold 8 bit color data while in the mask GIP 19 each framestore can be used to hold 8 bit masks or two separate 4 bit masks. Furthermore, one of the framestores in the GIP 19 can be used to display menus in one four bit plane and overlays in the other four bit plane. Overlays comprise construction lines and boxes and the like which are to be displayed on the monitor.

The eight bit data in each framestore 22, 23 is applied in four bit "nibbles" to respective scroll, amplify and zoom circuits 24–27 which operate in a conventional manner to perform one or more of the functions of scroll, zoom and amplify, the outputs from these circuits being fed to a mixer circuit 28. The circuit 28 mixes the data from each of the framestores 22 associated with the GIPs 15–18 with the data from each of the frame stores 23 associated with the GIPs 15–18 in accordance with the mask stored in the framestore 22 of the GIP 19. This mixer circuit which operates in two stages is described in more detail in EP-A-0344976.

The output from the mixer circuit 28 is fed to a two stage color converter 29 which converts the four color component data to three color component data e.g. red, green and blue suitable for controlling the display on a monitor screen 30.

In use, images are stored on the high speed image disks 11 and these images may have been generated by scanning original transparencies or other representations or they may have been created electronically using an electronic paint brush. The host 1 causes relevant portions of these images to be "paged" in and out of the bulk memory 21 in the GIPs 15–18 and brush profiles to be loaded and unloaded from the bulk memory 21 in the GIP 19. The interface adaptor 10 has its own 68020 processor to allow it independently to control the disks 11. The GIPs 15–18 are directed by the host 1 to do various things to images in the bulk memory 21 so that when a GIP attempts to access an address in an image that is not currently in its bulk memory then part of that memory is written back to disc and a new portion read in. After the GIPs have finished processing, the data in the framestores is then scrolled, zoomed and/or amplified as necessary, mixed in the circuit 28, converted to monitor format and then displayed.

If the host 1 wishes to display menus on the screen, these are drawn into the mask GIP framestore 23, known as the "overlay plane".

The digitizing tablet 5 not only indicates the current location of the pen 31 but also the pressure with which the pen is applied to the tablet. This pressure is contained within a seven digit data field allowing 128 possible pressure levels. The pressure value is taken by the host 1 and is used to address respective look-up tables in the memory 8. These look-up tables define the color components of the color to be used by the paint brush generated by the GIPs 15–18.

Figure 3B:
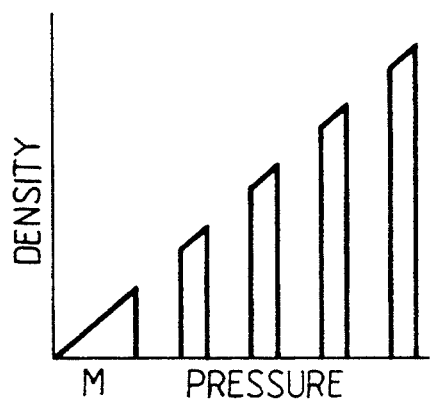
Figure 3C:
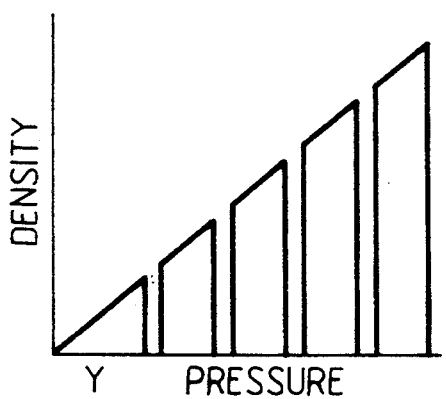
Figure 3D:
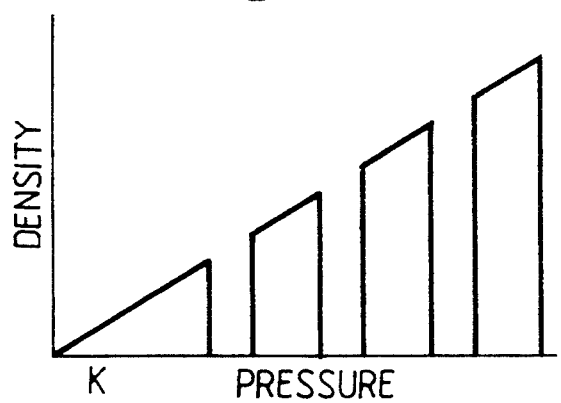

FIGS. 3A–3D illustrate by way of example four different color selection functions which are associated with the cyan, magenta, yellow and black color components respectively. Each look-up table has a set of addresses corresponding to all possible pressure values, typically 128, and in each address a density value is stored as defined by the appropriate function. It will be noted that in these examples each color selection function is discontinuous (although this will not always be the case) and for each color component there are certain pressure values which result in a zero density value. It will be noted, however, that the four functions are different.

Figure 4A:
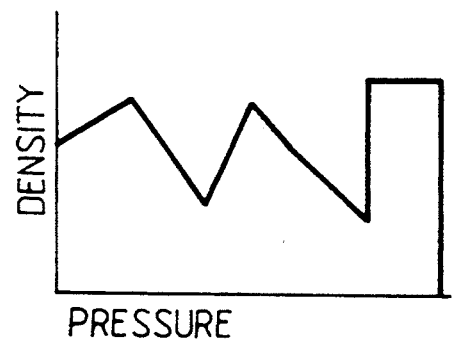
FIGS. 4A–4D illustrate four further color selection functions.
Figure 4B:
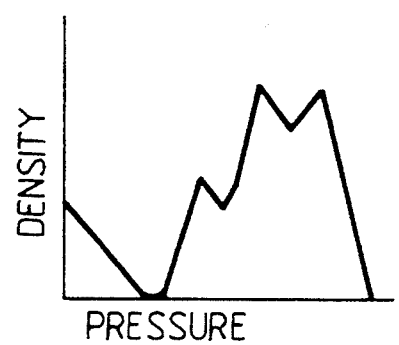
Figure 4C:
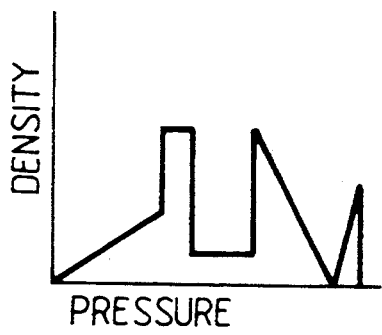
Figure 4D:
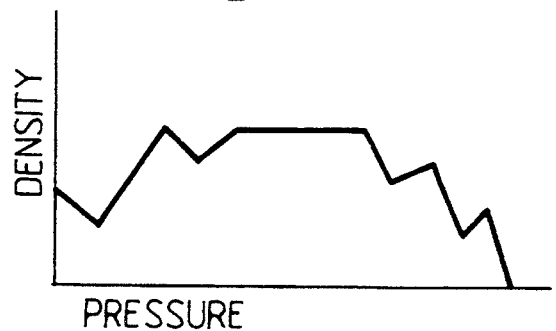

FIGS. 4A–4D illustrate four further color selection functions.

In operation, the operator or artist moves the pressure pen 31 across the tablet 5 and the host 1 monitors the applied pressure. The pressure signal is sampled regularly and in response to each pressure sample the look-up tables are addressed and the appropriate color component values accessed. These values are then used after modification by the density profile of the selected "brush" to lay down paint in the frame stores 23. The result is displayed on the monitor 30 after combination with any image in the frame stores 22.

The invention can have the effect of working with a multi-layer scraper board, given suitable look-up functions. That is, it gives the appearance that the harder the applied pressure the more layers are scraped away to reveal a particular color. If the brush has a curved density profile then the colors which have been scraped away would still remain visible at the edges of the brush so that the artist can soon learn to pass from a doodling mode in which colors flow rather like a oil film on water, to a controlled artistic mode in which selected colors can be pushed in a chosen direction.

In one application, the host 1 could respond to the detection of two different pressures at spaced positions across the tablet 5 to generate automatically a linear vignette of color varying between the colors defined by the two pressures.

The paint characteristics, such as hue, brightness, and saturation, carried by the paint brush are determined at least in part by the force with which the indicator is pressed onto the surface. This leads to another application which involves modifying brightness and saturation while maintaining hue constant.

We claim:

1. Image processing apparatus comprising an input device including an indicator and means defining a surface over which said indicator is moved; position determining means for determining the position of said indicator on said surface; a force monitor for monitoring the force with which said indicator is pressed onto said surface; a frame store for storing digital data defining the color component content of an image; a memory storing at least one lookup table of a plurality of color components that collectively define a color selection function, said memory being coupled to an output of said force monitor, and outputting a color component of the color selection function in direct response to the output of said force monitor; and processing means connected to said input device, said memory, and said frame store for simulating an electronic paint brush carrying paint which is laid down in said frame store at locations corresponding to the positions of said indicator on said surface and whose characteristics, including hue, brightness, and saturation, are determined at least in part in accordance with color components output by said memory.

2. Apparatus according to claim 1, wherein said processing means is adapted to maintain hue constant while modifying brightness and saturation in accordance with the monitored force.

3. Apparatus according to claim 1, wherein said memory outputs in accordance with the monitored force value a color selection function for each color component, the color selection function defining the variation in characteristic(s) of the corresponding color component with monitored force.

4. Apparatus according to claim 3, wherein the color selection function is discontinuous and defines color component values for spaced groups of force values.

5. Apparatus according to claim 3, wherein the image is defined by more than one color component, the associated color selection functions being different.

6. Apparatus according to claim 1, further comprising a display connected to said frame store so as to display the image defined by digital data in the frame store.

7. Image processing apparatus comprising an input device including an indicator and means defining a surface over which said indicator is moved; position determining means for determining the position of said indicator on said surface; a force monitor for monitoring the force with which said indicator is pressed onto said surface; a frame store for storing digital data defining the color component content of an image; a memory storing at least one lookup table of a plurality of color components that collectively define a color selection function, said memory being coupled to an output of said force monitor, and outputting a color component of the color selection function in direct response to the output of said force monitor; and processing means connected to said input device, said memory, and said frame store for simulating, during a painting mode of the imaging processing apparatus, an electronic paint brush carrying paint which is laid down in said frame store at locations corresponding to the positions of said indicator on said surface and whose characteristics are determined in part in accordance with color components output by said memory.

* * * * *